3,370,147
OVERRIDING CONTROL MEANS FOR A SERVO CONTROL SYSTEM ON AN ELECTRICAL DISCHARGE APPARATUS
Victor E. Matulaitis, Franklin, Mich., assignor to Ex-Cell-O Corporation, Detroit, Mich.
Filed May 13, 1964, Ser. No. 366,985
13 Claims. (Cl. 219—69)

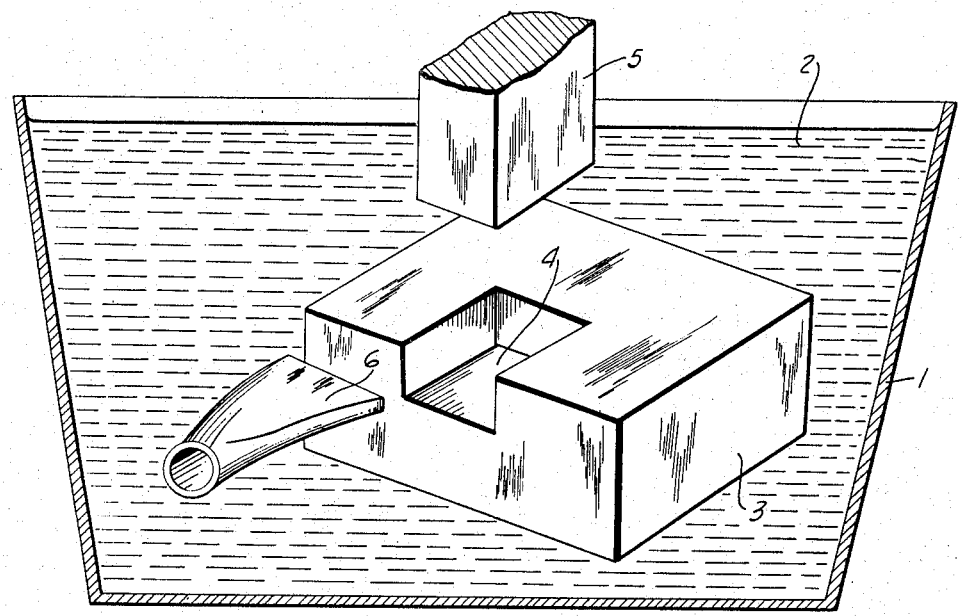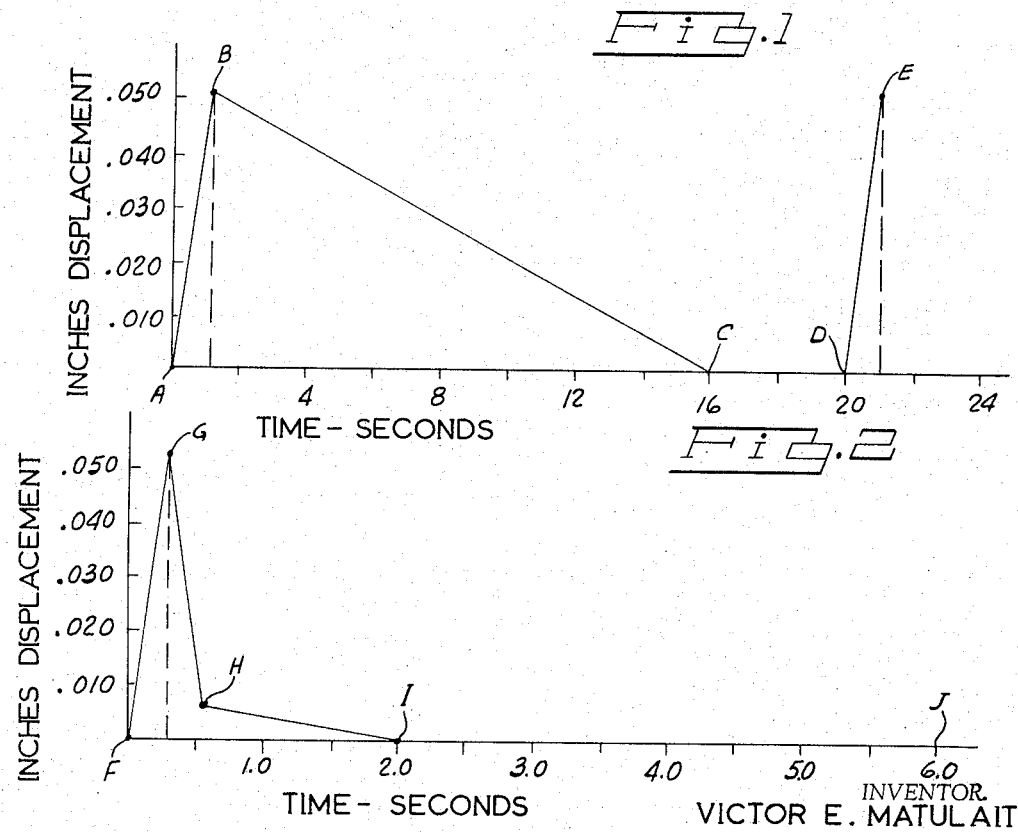

ABSTRACT OF THE DISCLOSURE

An electrical discharge machining apparatus provided with a circuit for a singular power feed system wherein the normal operator preselected servo control means can be periodically overriden by a first means for the automatic cyclic retraction and subsequent advance of the electrode tool at a preselected frequency of repetition, and preselected amplitude and rate of motion, followed by an operator preselected time interval wherein normal cutting occurs; a second jog means whereby the said normal servo means can be overriden, at the will of the operator, to provide manual jog movements of the electrode tool, where said jog means overrides both the normal servo, and cycle interrupter means, and a third means for the immediate retraction of the electrode tool from the workpiece at maximum possible speed, overriding servo, cycle interrupter and jog means, in the event of abnormally low gap voltage, or in the event the gap is short circuited.

The electric arc discharge apparatus are well known in the art, for example, Williams, U.S. Patent No. 2,835,784 discloses a spark machining apparatus. This apparatus employs a condenser charging and discharging circuit for developing unidirectional pulses between an electrode and a workpiece in which the electrode is negative with respect to the workpiece. The Williams' patent also discloses means for moving the electrode relative to the workpiece to modify the "working gap," i.e., the distance which separates the electrode from the workpiece. Williams' Patent No. 2,836,785 issued May 20, 1958, discloses an apparatus for spark machining in which a servo system is employed to control the position of the electrode relative to the workpiece in accordance with the potential existing between the electrode and the workpiece. Williams' Patent No. 2,841,686 issued July 1, 1958 discloses a spark cutting apparatus in which a servo system is employed to control the positioning or displacement of the electrode relative to the workpiece in response to electrical parameters in the system. The ultimate position of the electrode represents a comparison of these two parameters. Still another spark machining apparatus is disclosed in Porterfield Patent No. 2,887,561 issued May 19, 1959. In these Porterfield apparatus, a servo system is employed to control the positioning of the workpiece and this system is actuated in accordance with the pulses supplied to the electrode and workpiece. In these apparatus, the working gap or the spacing between electrode and the workpiece under machining conditions, is usually on the order of .0006 to .0025 inch. Also in these machining apparatus, if large holes are to be cut, or if the workpiece is of relatively hard material, it is necessary to employ a coolant fluid flowing in and through the working gap to prevent the collection of chips which might otherwise short-circuit the working gap. Frequently, this cooling fluid is directed through apertures in the electrode, or through passages in the workpiece. When machining certain types of holes, however, such as a flat bottom cavity, the use of an electrode employing apertures through which coolant is forced is precluded. In other words, if an electrode were employed in which a coolant passage was provided axially through the electrode, then the opening of this aperture at the surface opposite the workpiece would result in a complementary raised portion in the workpiece. Further, it is often necessary to machine a cavity in which the bottom of the cavity has an irregular or contoured shape as is common on ornamental die plates, button plates, or cavities frequently associated with die cast dies and plastic molding dies. In all of these examples, the coolant holes normally employed in the electrodes cannot be employed because of their detrimental effect on the desired cavity geometry. Attempts have been made to obviate this disadvantage by jogging the electrode relative to the workpiece; that is, by manually "pumping" the electrode into and out of its work-gap defining position. By pumping the electrode after each cutting period of from two to ten seconds' duration, it is often possible to produce "blind" cuts of depths of the order of ½" to 1", particularly by employing some form of auxiliary flushing. The disadvantage of this operating procedure of manually pumping the electrode, is that it is time consuming, inefficient, and requires the immediate attention of a machine operator.

In order to modify an existing servo system, the servo system must be provided with a "servo cycle interrupting system" which terminates normal servo operation and reciprocates the electrode between a machining position such as a position defining a working gap with the workpiece and a position remote from the workpiece with a period of dwell in the machining position. Since the effectiveness or "cutting efficiency" of any machining apparatus of this type is obviously expressed as the ratio of the cutting time to the total elapsed time, the time spent in the initial retraction of the electrode from the workpiece, and the subsequent time spent in repositioning the electrode at the proper gap spacing relative the workpiece should be kept to a minimum.

Accordingly, it is an object of this invention to provide a machining apparatus with a normal servo operation system and to provide this system with a highly efficient servo cycle interrupting means for periodically and automatically interrupting the normal servo operation by the retraction of the tool from an initial machining position relative to the workpiece and the subsequent rapid advancement of the tool to a position other than the machining position.

A further object of this invention is to provide an electrical arc discharge apparatus with a servo system which performs a normal servo operation and which additionally incorporates a system with a servo cycle interrupting means which provides for varying the degree of electrode retraction and to provide means for preselecting the degree of electrode retraction.

Yet a further object of this invention is to provide an electrical arc discharge apparatus with a servo system for normal servo operation with provision for a servo cycle interrupting arrangement in which the frequency of interruption is variable.

Still another object of this invention is to provide an electrical arc discharge apparatus with a servo system in which the normal servo operation is controlled in accordance with a predetermined speed control and to provide this system with a servo cycle interrupting arrangement in which the retraction of the electrode from the machining position and the subsequent advance of the electrode toward the electrode or working gap defining position occur at maximum possible servo system speed regardless of the setting of the speed control of the normal servo operation network.

Yet a further object of this invention is to provide a discharge machining apparatus in which normal servo operation over-rides the servo cycle interrupting process so that neither the electrode nor the workpiece can be damaged during the electrode or tool retraction or during the subsequent electrode advance toward the workpiece if a partially attached electrode or core, a loose electrode or core, or even a dislodged or loosened portion of the workpiece or electrode create an obstruction within the gap during any portion of the cycle interrupting period.

Another object of this invention is to provide an electrical discharge machining apparatus with a servo cycle interrupting system in which rapid electrode advancement following the electrode retraction terminates at a point short of the optimum machining position.

A further object of this invention is to provide a discharge machining apparatus in which the servo cycle interrupting means advances the electrode at maximum available servo speed to a point short of the optimum machining position and the servo system is restored to its normal servo operation to more slowly advance the electrode to the optimum machining position and the machining resumes at the preselected and preset control conditions for normal servo operation.

A further object of this invention is to provide an electrical machining apparatus with a servo cycle interrupting arrangement which rapidly retracts the electrode from a working gap defining position to a retracted position and first advances the electrode toward the workpiece at a first rate of advance and secondly, advances the electrode toward the work gap defining position at a slower rate than the first mentioned advance rate.

A further object of this invention is to provide an electrical machining apparatus with a servo system which contains provision for normal servo operation and with a system for interrupting the normal servo cycle and which apparatus also includes provisions whereby the operator may over-ride the automatic servo cycle interrupting arrangement through manipulation of manual jog controls.

Still a further object of this invention is to provide an electrical machining apparatus with a normal servo operation system, a servo cycle interrupting arrangement and manual jog controls in which it is impossible for the workpiece or electrode to be damaged through the incorrect operation of the manual jog controls.

Briefly, in accordance with aspects of this invention, I provide an electrical machining apparatus with a source of unidirectional pulses coupled to the electrode and workpiece, a reference voltage source for comparing an adjustable potential with the potential existing between the workpiece and the electrode as supplied by the power supply and a normal servo operation system including the DC power supply and the reference voltage source and servo system actuating means connected between the reference voltage source and the direct current power supply. The actuating means includes a servo controlling arrangement for controlling the operation of the electrode supporting system in accordance with the magnitude and direction of current flow between the reference voltage source and the electrode-workpiece potential, which potential is proportional to the electrode-workpiece spacing. Advantageously, this servo system includes means for controlling the rate of electrode advance relative to the workpiece which means may be manually adjusted by the operator. Also advantageously, this system includes a manually controllable pair of jog circuits for selectively advancing or retracting the electrode relative to the workpiece which jog circuit arrangement may be employed to control advance and retraction of the electrode at a different rate which rates are also adjustable. This combination of systems includes provision for preventing damage to electrode or workpiece through the incorrect operation of the jog circuits or the switches employed in the jog circuits.

In accordance with still other aspects of this invention, I provide a discharge machine apparatus with a normal servo operating system and a servo cycle interrupting system in which the servo cycle interrupting system may be selectively actuated by means of the operator, and once actuated, automatically controls the periodic retraction of the electrode from the work-gap defining or machining position to a retracted position, advances the electrode toward the workpiece for a shorter period of time than the time required for the electrode retraction and subsequently advances the workpiece or the electrode relative to the workpiece at a slower rate than the first predetermined advancing rate until the electrode has been returned to a work-gap defining or machining position. The servo cycle interrupting system includes first timing means for determining the period in which the electrode is retracted and for controlling the period in which the electrode is first advanced from the retracted position, and second timing means for controlling the period of slow advance and cutting while the electrode is in a work-gap defining or machining position. These timing means are coupled together to perform a continuous repetitive cycle in which the electrode is retracted and advanced at maximum available servo speed, then slowly advanced by the servo system and performs a cutting operation and repeats this cycle. Advantageously, because the work gap defining position is quickly restored and machining is resumed relatively soon after the electrode is retracted, the system has a relatively high efficiency. Preferably, the rate of initial advancement of the electrode relative to the workpiece is a rate approximating the rate of retraction and the second rate of advance of the electrode is at a slower rate relative to the first advance rate.

These and various objects and features of the invention will be more clearly understood from a reading of the detailed description of the invention in conjunction with the drawings in which:

FIG. 1 is a perspective view, partly in section of an electrical discharge machining arrangement including an electrode and a workpiece;

FIG. 2 is a graphical time plot illustrating a cycle of operation of the prior art type of apparatus;

FIG. 3 is a time plot employed in the explanation of the instant invention; and, FIG. 4 is a combined block and schematic diagram of portions of this illustrative embodiment of the invention.

Figure 4:
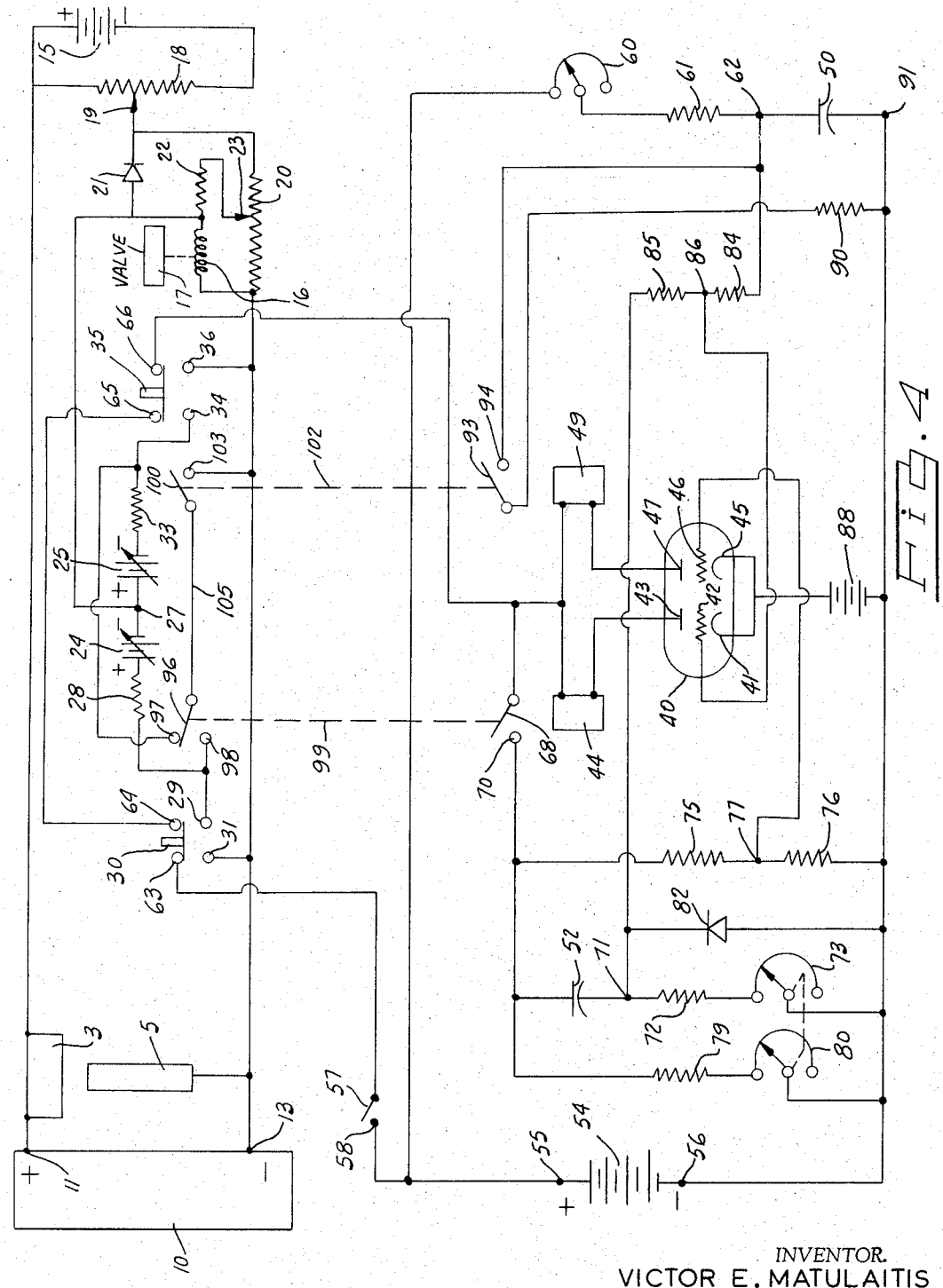

Referring now to FIG. 1, there is shown a view in perspective and partly in section in which a tank 1 containing a suitable dielectric fluid 2 also contains a workpiece 3 which is to be machined to provide a cut of the type indicated by the rectangular cut 4 which cut is to be produced by means of an electrode 5, the cutting operation being aided by the flow of coolant fluid through a suitable nozzle 6. The electrode 5 and the workpiece 3 are connected to suitable terminals of a source of unidirectional electrical pulses of the type well known in the art. The principal problem illustrated in FIG. 1, is that of producing a relatively flat bottomed cut 4 and the same problem would or could be illustrated with respect to performing a cut in which the bottom has a predetermined contour. It is unimportant that the cut is shown in the edge of the workpiece. The same problem would exist if the cut were to be made within the edges of the workpiece. In solving or attempting to solve this problem, the prior art apparatus has employed servo systems which included servo cycle interrupting arrangement, the operation of which can be explained with respect to the time plot of FIG. 2. In FIG. 2 the abscissa is time in seconds required for the completion of each of the functions of the system and the ordinate is that of inches displacement relative to the working gap. It is understood that the electrode 5 in FIG. 1 when in a work gap defining position is spaced from the workpiece 3 a distance of the order of .0006″ to .0025″ and from this initial work gap defining position illustrated at point A in FIG. 2, the electrode 5 is retracted to a displacement of .050″ from the work gap defining position as illustrated at point B. Subsequently, the electrode is advanced toward the workpiece to return the electrode 5 to its work-gap defining position as indicated at point C. Subsequently, the discharge takes place to perform the machining operation until a point D is reached at which retraction of the electrode is again begun corresponding to the point A in the previously described cycle, and this retraction continues until the electrode reaches its retracted position as indicated at point E. The electrode is then advanced toward the workpiece in a manner previously described with respect to the line between points B and C. From this illustrative example, it is apparent that the retraction of the electrode requires a period of time of the order of 1 to 1½ seconds while the period for advancing of the electrode to return the electrode to its work gap defining position, requires an interval of time of the order of 14½ to 15 seconds. When the electrode is restored to its work gap defining position as indicated at point C, cutting takes place for a period of 4 seconds, namely, the interval between the points C and D in FIG. 2. Because the entire cycle requires an interval of time of twenty seconds and the cutting operation is taking place for only four seconds of this cycle, the efficiency, that is, the cutting efficiency, of the system is only 20%. I have discovered a method and apparatus in which this cutting function can be quickly and efficiently performed. The time plot of the cycle of operation of my improved method and apparatus is shown in FIG. 3.

Referring now to FIG. 3, there is depicted, to a time scale expanded relative to that of FIG. 1, a time plot in which the abscissa is time in seconds and the ordinate is displacement from the working gap defining position of the electrode expressed in thousandths of an inch. At point F the novel cycle begins in which the electrode is retracted to a displacement of the order of .050″ as indicated at point G. At this point a comparison of the graphs of FIG. 3 and FIG. 2 illustrates that although the slope of the line FG appears to correspond with the slope of the line AB, of FIG. 2, the difference in abscissas of the two scales clearly illustrates that the retraction of the electrode during the novel method of this apparatus has required a period of time of the order of 3/10 of a second as opposed to an interval of the order of 1 second to 1½ seconds with respect to the cycle of FIG. 2. After the electrode is retracted as indicated by point G, the electrode is now advanced at a rapid rate until it is advanced to a point just short of the working gap as indicated by point H. The interval of time GH is always slightly less than the interval required for retraction as illustrated by FG. At point H, the electrode begins a slow advance until the electrode reaches a work gap defining position as indicated at point I. Because the electrode is now in a work gap defining position, machining begins and continues until a point J is reached at which retraction begins corresponding to the point F at the beginning of the cycle and the cycle repeats itself. Because the interval of time I–J extends for a period of 4 seconds, whereas the retraction and advance of the electrode has required only an interval of 2 seconds, the efficiency of this novel method is 66⅔ percent.

FIG. 4 is a combined schematic, pictorial and block diagram of an illustrative arrangement by which the method outlined with respect to FIG. 3 may be performed. Shown in FIG. 4 the block 10 represents a direct current pulse power supply which may be of the type disclosed in any one of the above mentioned patents in which unidirectional pulses are supplied from a terminal 11 to the workpiece 3 connected to the positive terminal 11 of the power supply. The power supply 10 includes a negative terminal 13 which is connected to electrode 5. The apparatus includes mechanical structure for advancing and retracting the electrode relative to the workpiece and this apparatus is under the control of a normal servo operation electrical control system in a manner described below.

*The normal servo operation electrical control system*

The normal servo operation electrical control system includes an actuating means in the form of a coil 16 and a servo valve 17 which is adapted to be biased to an intermediate position by a pair of springs, not shown, and provided with suitable conduits so that current flow through coil 16 in one direction moves valve 17 in a direction to cause the servo system to move the electrode 5 in one direction, such as to advance the electrode in one direction and current flow through coil 16 in the opposite direction moves valve 17 in the opposite direction and causes servo fluid flow which causes retracting movement of the electrode 5.

The electrical control system includes a source of reference direct current potential 15 and a potentiometer 18 which is connected in parallel with the source 15. One terminal of this parallel network is connected to the positive terminal 11 of the source 10. The variable tap 19 of the potentiometer 18 is connected to a potentiometer 20, the other terminal of which is connected to one terminal of the coil 16. The variable tap 19 is also connected by a diode 21 to the opposite terminal of the coil 16. A resistor 22 is connected between the variable tap 23 on the potentiometer 20 and the coil 16. With the above described circuit normal servo operation is obtained in which the electrode 5 is maintained in a working gap relationship relative to the workpiece 3 and is advanced toward the workpiece 3 as a function of the electrode-workpiece potential and is thus advanced as a function of the amount of material machined away from the workpiece because the system reponds to the spacing of the electrode relative to the workpiece by responding to the difference in potential between the electrode and workpiece. If the electrical potential between electrode 5 and workpiece 3 rises or falls relative to the reference voltage source including battery 15 and potentiometer 18, current flows through potentiometer 20 and a part of this current divides and flows through resistor 22 and coil 16. In this way potentiometer 20 acts as a preset servo speed control because the closer the variable tap of the potentiometer 20 is positioned toward the left as viewed in FIG. 4, the less potential will be applied to coil 16 and resistor 22. As a result, less than maximum speed of the servo system will be obtained. If, however, the variable tap of potentiometer 20 is placed at the right hand end of the potentiometer 20 as viewed in FIG. 4, then the potential impressed across resistor 22 and coil 16 will be a maximum and will result in maximum servo speed. Accordingly, the potentiometer 20 gives a control of the amount of servo action which takes place. The purpose of diode 21 is to provide for full speed retract current in the event that the electrode 5 becomes shorted to the workpiece 3 which full retraction speed will be available independently of the setting of the servo control rate potentiometer 20. In other words, if the variable contact 23 of the potentiometer 20 were set to the left hand terminal position, no potential will be applied across the coil 16 and the resistor 22 in response to a voltage difference between terminal 13 and the variable tap 19 of potentiometer 18. If the machining gap were short circuited such that the electrode 5 engaged the workpiece 3, full servo speed retract current would flow from workpiece 3 to electrode 5 through the coil 16, the diode 21, to the variable contact 19. The machining apparatus is provided with a manually controllable pair of jog circuits for selectively advancing and retracting the electrode relative to the workpiece in a manner described below.

*The jog circuits*

The jog circuits include a pair of variable direct current sources 24, 25 which may be selectively connected across the coil 16 to control the direction and magnitude of energization of the coil 16 to thereby control the operation of the servo valve to advance or retract the electrode 5. The sources 24, 25 are connected together at a terminal 27 and the terminal 27 is connected to the diode 21 and to the point intermediate coil 16 and resistor 22. Source 24 is connected through a resistor 28 to a contact 29 of a manually operable switch 30 which switch is operated to retract the electrode 5. The switch 30 also includes a contact 31 connected to the negative terminal 13 of source 10 and when the switch 30 is depressed connecting contacts 29, 31 the battery 24 is connected through the resistor 28 and the contacts 29, 31 to one terminal of coil 16. Because the other terminal of coil 16 is already connected to terminal 27 of the battery, or source 24, current flows from source 24 through the coil 16 in a direction to cause the servo valve 17 to actuate the servo system to retract the electrode 5. The source 25 is connected through a resistor 33 to a terminal 34 of a switch 35 and the switch 35 includes a contact 36 which is connected to terminal 13 of source 10. When the switch 35 is depressed the source 25 is connected to the coil 16 in a direction such that current flows through the coil 16 in opposite direction to that in which current flowed when the source 24 was connected to the coil 16. Accordingly, the servo valve 17 is actuated in a direction to advance the electrode 5 relative to the workpiece 3. The switches 30, 35 include suitable biasing means such as individual springs (not shown) for retaining the switches in the position indicated in FIG. 4. Advantageously, the resistor 22 and the potentiometer 20 are connected in parallel relative to the coil 16 with respect to the potentials of the sources 24 or 25 whenever the retract switch 30 or the advance switch 35 is operated. Accordingly, the rate of retract or advance of the electrode 5 relative to the workpiece 3 under the manually controllable jog circuits is independent of the servo control rate. Thus, the manual jog rate is always the rate that is preset by adjustment of sources 24, 25. The purpose of making potential sources 24 and 25 variable is to permit manual control of the rate of advance and retraction of the electrode 5 relative to the workpiece 3 during actuation of the switches 30, 35. The sources 24, 25 and their associated resistors 28, 33, respectively, are proportioned so that if switches 30, 35 are erroneously operated simultaneously, the potential at terminal 27, is somewhat negative relative to terminal 13. This results in a current flow through coil 16 in a direction to cause the electrode 5 to retract from the workpiece 3. In other words, the system is "fail-safe" in that the electrode cannot be forcibly driven into the workpiece through the inadvertent simultaneous operation of switches 30, 35.

If one or both of the jog switches are inadvertently or intentionally operated during the time that normal machining operation is taking place, the servo coil 16 passes current from two parallel sources. One of these is the combination of arc-gap potential and the voltage reference source including source 15 and potentiometer 18. The other source is one or both of the jog circuit sources 24, 25. Operation of the switch 30 will cause the electrode 5 to retract from the workpiece 3 because source 24 and resistor 28 are so proportioned relative to the voltages produced by the normal servo means as to over-ride these voltages and thus insure a retraction of the electrode 5 from the workpiece 3 even though the servo controls have been set for "down-feed" or advance of the electrode 5 toward the workpiece.

During normal electrical-discharge machining, the coil 16 conducts current in the direction which causes a very slow advance of the electrode 5 toward the workpiece 3. This in-feed is just sufficient to advance the electrode as rapidly as material is removed from the workpiece 3. If the jog-down switch 35 is operated while the machining operation is in progress, the jog circuit will cause a current flow through coil 16 which would be additive to the normal servo current. The combination of the two currents will cause the servo system rapidly to advance the electrode or tool into the workpiece. Advantageously, the potential of source 25 and the size of resistor 33 is such that the current from the basic servo system including the reference voltage source 15 and the source 10 over-rides the jog-down current whenever the arc-gap or the gap between the electrode 5 and the workpiece 3 is short circuited. Accordingly, if the jog-down switch 35 is depressed during the course of a machining operation, the electrode will advance toward the workpiece 3 only until such time as a short circuit is produced at the working gap whereupon the electrode 5 will retract from the workpiece. Accordingly, neither the electrode 5 nor the workpiece 3 can be damaged by the inadvertent operation of the jog-down switch 35. Even if the operator continues to hold down the jog-switch 35, the electrode 5 will be reciprocated relative to the workpiece by the servo action such that damage cannot occur.

The electro machining apparatus includes a servo cycle interrupting system which is capable of rapidly reciprocating the electrode 5 relative to the workpiece 3 to machine cuts which are difficult to machine and which require special contours such that neither the electrode nor the workpiece can be provided with apertures through which coolant may be forced during the cutting operation in a manner described below.

*Servo cycle interrupting system*

The apparatus includes an electrical control servo cycle interrupting system, which when actuated, periodically moves the electrode away from a work gap defining position to a position remote from the workpiece and it returns the electrode rapidly to a position adjacent to its initial position and more slowly returns the electrode to its final work gap defining position and permits the electrode to dwell in the work gap defining position for an extended period of time before the cycle is repeated. This servo cycle interrupting system includes first and second switching means and first and second timing means for controlling the actuation of the switching means which switching means is employed selectively to control the connection of sources of potentials 24, 25 directly across the servo valve actuating coil 16 to thus cause the servo system to retract the electrode 5 at the maximum available servo speed and to start the advance of the electrode 5 at maximum available servo speed for a period less than the period of retraction and to restore the normal servo operation to permit the normal servo electrical control system to slowly return the electrode 5 to its work gap defining position. Because the timing means includes means for delaying the subsequent retraction of the electrode relative to the workpiece, the system permits a period of dwell in the work gap defining position to thus permit machining for an extended period of time. In the illustrative embodiment shown in FIG. 4, the first switching means includes one triode section of an electron tube 40 and a relay 44 which is controlled by the left hand triode section of the tube 40. The tube 40 includes a cathode 41, a grid 42 and an anode 43 which constitutes the left hand triode section as viewed in FIG. 4, and a right hand section including a cathode 45, a grid 46 and an anode 47. The triode section including elements 45, 46 and 47 combines with a relay 49 to constitute a second switching means. The energization or current flow through the respective triode sections is controlled by first and second timing means respectively. The first timing means includes a capacitor 50 and its corresponding charging and discharging circuits and the second timing means includes a capacitor 52 with its respective charging and discharging circuits. The servo cycle interrupting system is energized from a source 54 having terminals 55, 56 which in this particular instance are positive and negative terminals respectively. The actuation of the servo cycle interrupting system is achieved by means of a switch 57 having a contact 58 connected to the terminal 55 of the source 54. The source 54 is employed to provide the anode-cathode potential of both triode sections of the tube 40 and to supply the charging currents for the timing means 50, 52. The capacitor 50 is connected at all times between terminals 55, 56 of source 54 by means of a variable potentiometer 60 and a resistor 61. Thus, the capacitor 50 under quiescent conditions remains charged from the source 54. The charging circuit for the capacitor 52 and the anode potential supplying circuit includes the switch contacts 57, 58, a pair of contacts 63, 64 of the switch 30, and a pair of contacts 65, 66 of the switch 35. Contact 66 is connected to one terminal of the windings of the relays 44, 49, the opposite terminals of the windings being connected to anodes 43, 47 respectively. The charging path for the capacitor 52 includes an armature 68 which is connected to the contact 66 of switch 35 and a second contact 70 connected to the capacitor 52 and positioned to be engaged by the armature 68. In the ensuing description it is to be understood for reasons of simplicity that the words relay armature and relay armature contact are used interchangeable as is obviously appropriate. The charging path for the capacitor 52 is completed through a fixed resistor 72 and a variable potentiometer 73. The capacitor 52 has a pair of parallel connected discharge circuits including a first pair of serially connected resistors 75, 76. The intermediate terminal 77 is connected to the grid 46 of the right hand triode section of the tube 40. The second discharge circuit for the capacitor 52 includes a serially connected resistor 79 and a variable potentiometer 80. The sliding contacts of the variable potentiometers 73, 80 are mechanically connected together so that they will be simultaneously adjusted to thus control the charging and discharging circuits, so that the timing functions controlled by the charging and discharging rates will be equal. A diode 82 is connected between the terminal 71, intermediate resistor 72 and capacitor 52, and the terminal 56 of source 54. The purpose of diode 82 is to provide a return path for the discharge current of capacitor 52 through the previously mentioned parallel discharge paths. The capacitor 52 is connected to the capacitor 50 and specifically to the terminal 62 by means of a pair of serially connected resistors 84, 85 which are serially connected between the terminals 71, 62. A terminal 86 is intermediate the resistors 84, 85 and is connected to the grid 42 of the left hand triode section of the tube 40. The tube 40 is provided with a suitable source of bias 88 which is connected to the cathodes 41, 45 and to the grids 42, 46. The grid bias circuit for the grid 46 includes resistor 76 while the grid bias circuit for the grid 42 includes potentiometer 73, resistor 72, the terminal 71 and resistor 85. The capacitor 50 is provided with a discharge path including a resistor 90 connected to a terminal 91 of the capacitor 50 and connected to an armature 93 of the relay 49. The armature 93 is positioned to engage a contact 94 of the relay 49 which contact is connected to terminal 62 of the capacitor 50. Thus when the relay 49 is energized to close the armature 93 with the contact 94, the resistor 90 is short circuited across the capacitor terminals 62, 91. The relay 44 includes an armature 96 which has an associated pair of contacts 97, 98 which in the released position of the armature 96 defines a circuit with the contact 97 while in the operated position the armature 96 engages the contact 98. The armatures 68, 96 are mechanically connected together as indicated by the dotted line 99. The contact 98 is connected to the resistor 28 and the contact 97 is connected to the resistor 33. The relay 49 includes an armature 100 which is mechanically linked to the armature 93 as indicated by the dotted line 102. The armature 100 is positioned to engage a contact 103 when the relay 49 is actuated. The contact 103 is connected to terminal 13 of the source 10 and to the servo valve actuating coil 16. The armatures 96, 100 are connected together by means of a conductor 105. If the circuit of FIG. 4 is in the condition shown in which relays 44, 49 are released, or deenergized and the relay 49 is then energized, it closes its armature 100 to engage its contact 103 to thus connect the advance source of potential 25 and its associated resistor 33 directly across the actuating coil 16 rather than through the servo speed control resistor 20, or the resistor 22. Thus under these conditions the advance of the electrode 5 will be at the full servo speed. Similarly, if both relays 44 and 49 are actuated, the armatures 96, 100 will connect the retract source of potential 24 and its associated resistor 28 directly across the actuating coil 16 of the servo system to thus cause retraction of the electrode 5 from the workpiece work gap defining position at maximum available servo speed. The cyclic operation of the servo cycle interrupting system will now be described in detail which cyclic operation is controlled by the first and second timing means.

When the machine tool operator desires to machine a substantially flat bottomed cut or a cut having a particular bottom contour, he employs or operates the switch 57 to engage its associated contact 58 to thus connect the source 54 through contacts 63, 64 and 65, 66 to the windings of relays 44, 49 and to the armature 68 of relay 44. Thus the positive potential existing at terminal 55 of the source 54, will be connected through the relay winding of relays 44, 49 to the anodes 43, 47 respectively of the dual triode tube 40. Because capacitor 50 of the first timing means is normally charged, it applies through the resistor 84 a positive potential to the grid 42 of the left hand triode section of the tube 40 which positive potential is normally maintained such that when anode potential is applied to the anode 43, the left hand triode section conducts and the cathode-anode current flowing between cathode 41 and anode 43 flows through the winding of the relay 44 to energize this relay and thus move the armatures 68, 96 to the position in which they engage their respective contacts 70, 98. When armature 68 engages contact 70 of the relay 44, the source 54 is connected to the charging circuit of capacitor 52 which charging circuit includes resistor 72 and potentiometer 73. Because capacitor 52 is normally substantially discharged, the potential of source 54 appears at terminal 71 when the armature 68 engages the contact 70. The appearance of this potential at terminal 71 causes current flow through resistor 72 and potentiometer 73. No current flows through diode 82 because of its polarity. Simultaneously, current flows from contact 70 through resistor 79 and potentiometer 80. Also, current flows through the parallel path including resistors 75, 76. The current flow through these parallel paths produces two effects. First the flow of current through resistors 75, 76 raises the potential of grid 46 of the right hand triode section of the tube 40 so that anode 47 passes plate current or anode current, to thus energize relay 49. Energization of relay 49 causes armatures 93, 100 to engage their respective contacts 94, 103. The second effect of the current flow through the parallel circuits is that capacitor 52 begins to charge and consequently, the potential of terminal 71 gradually decreases. The engagement of the armature 100 with its associated contact 103 thus connects source 24 and its associated resistor 28 through the contact 98 and the armature 96 directly across the servo actuating coil 16 such that the coil 16 controlled its associated valve 17 at full servo speed to retract the electrode 5. Thus the closing of the armature 100 with its contact 103 after the armature 96 had engaged its contact 98, corresponds to the point F on the graph of FIG. 3 for the initiation of the cycle of the servo cycle interrupting system. The retraction of the electrode 5 continues for a period of time indicated graphically by the interval FG in FIG. 3. In the circuit of FIG. 4, this time interval is determined by the following circuit. The retraction time interval is determined by the time required to charge the capacitor 52 through its associated charging circuit 72, 73. Thus the adjustment of the potentiometer 73 controls the retracting interval F-G of the graph of FIG. 3. By adjusting the potentiometer 73, the apparatus is thereby controlled to predetermine the amount of displacement to which the electrode 5 is moved relative to the working gap defining position indicated generally at point F on the graph of FIG. 3. As capacitor 52 continues to charge through its associated charging circuit, the potential at terminal 71 progressively falls in accordance with a logarithmic decrement as is well known in the electrical art which fall of potential causes the potential at terminal 71 to approach the potential at terminal 56 of the source 54. At some predetermined time during this voltage decrease, the potential on grid 42 reaches a value at which it interrupts the current flow from cathode 41 to anode 43 and thus the relay 44 will be de-energized. The de-energization of relay 44 causes the opening of the armature 68 and its associated contact 70 and the movement of armature 96 from a position of engagement with contact 98 to a position of engagement with contact 97. Thus the armatures 68, 96 will be in the position indicated in FIG. 4. Since control grid 46 remains connected to the positive terminal of source 54, through resistor 75, relay 49 remains energized and thus acts to connect potential of source 25 through resistor 33 to provide electrical flow through servo valve actuating coil 16 to thus cause the initiation of the advance of the electrode 5 toward the workpiece 3. Thus the closing of contact or armature 96 with its associated contact 97, corresponds to the point G on the cycle of operation shown graphically in FIG. 3. Because the potential of source 25 is diminished only by the potential drop across the resistor 33, the servo system advances the electrode 5 relative to the workpiece 3 at the maximum available servo speed. It is essential in the operation of this system that the maximum servo speed advance of the electrode 5 continue for a period less than the period required for the retraction of the electrode, i.e., the period F-G shown in FIG. 3 because the electrode must not be advanced at this speed until it reaches the final optimum working position, otherwise a slight over-shoot of this servo system would cause the workpiece to forcefully be engaged by the electrode and thus result in damage to either or both. Accordingly, the second timing means controls or limits the time interval G-H of FIG. 3, or the time interval of rapid advance of the electrode 5.

The second timing means including capacitor 52 controls the rapid advance period and this period is limited by the discharge rate of the capacitor 52 through its parallel connected discharge paths previous described. Because one of these paths includes serially connected resistors 75, 76 and because the intermediate terminal 77 is connected to the grid 46, at some time during this discharge interval, the potential at terminal 77 goes negative relative to cathode 45 as a result of a connection of bias source 88 to thus cause the grid 46 to interrupt the flow of current between the cathode 45 and the anode 47. The interruption of the flow of the cathode-anode current between 45, 47, de-energizes the relay 49 causing the armatures 93, 100 to move to their open position as indicated in FIG. 4. This point in time corresponding to the opening of armatures 93, 100 corresponds with point H on the time plot of FIG. 3.

The opening of the connection between the armature 93 and its associated contact 94 removes the resistor 90 from the short circuiting path across the capacitor 50 where it was employed to discharge the capacitor 50 and the capacitor 50 is now in a condition to start charging from the source 54 through the charging circuit including potentiometer 60 and the resistor 61. The period of time during which the capacitor 50 is charging corresponds to the period of time in which the electrode is being slowly advanced under the control of the normal servo operation electrical control system plus the time in which the electrode 5 is in a dwell or work performing position, or stated otherwise, in a machining position. This charging time corresponds to the interval H-J on the plot of FIG. 3 and at point J the capacitor 50 has charged to a point at which the grid 42 is positive and permits cathode-anode current between the cathode 41 and the anode 43 to re-energize the relay 44 and thus start the cycle at point F on the time plot of FIG. 3 at which the system starts to retract the electrode 5. Because the charging rate or the time required for the capacitor 50 of the first timing means to charge itself determines the interval occupied by the slow advance and the machining functions, the interval of machining can be selectively controlled by the adjustment of potentiometer 60. When the relay 49 is de-energized, servo cycle interrupting system is effectively disconnected from the jog circuits and the normal servo operation electrical control system continues to control the advance of the electrode 5 until it reaches a predetermined optimum position as determined by the initial setting of the contact 19 on the potentiometer 18. This interval corresponded to the slow advance interval between H and I on the time plot of FIG. 3. After the electrode 5 reaches the optimum position, a working period ensues in which the workpiece is being machined by the flow of current in a manner well known in the art. This interval corresponds to the time interval I-J in the plot of FIG. 3. This servo cycle interrupting system cyclic withdrawal and advancement of the electrode 5 will continue until the operator opens the switch 57.

Thus the foregoing description of the apparatus and method clearly illustrates how the high efficiency machining operation is obtained and how the workpiece is safeguarded against an incorrect operation of the jog switches 30, 35 and how the normal servo electrical control system overrides the other portions of the apparatus to provide a system which is failsafe and in which neither the workpiece nor the electrode can be damaged.

*Typical values of this illustrative embodiment*

| | | |
|---|---|---|
| Resistor 28 | ohms | 200 |
| Resistor 33 | do | 500 |
| Resistor 79 | do | 10K |
| Resistor 72 | do | 10K |
| Resistor 75 | do | 270K |
| Resistor 76 | do | 470K |
| Resistor 85 | megohm | 1 |
| Resistor 84 | do | 1 |
| Resistor 61 | ohms | 68K |
| Resistor 90 | do | 1000 |
| Resistor 22 | do | 600 |
| Potentiometer 18 | do | 400 |
| Potentiometer 80 | do | 100K |
| Potentiometer 73 | do | 100K |
| Potentiometer 60 | megohm | 1 |
| Potentiometer 18 | ohms | 10K |
| Servo-coil 16 | do | 600 |
| Relay coils 44 and 49 | do | 10K |
| Capacitor 52 | millifarads | 2 to 16 |
| Capacitor 50 | do | 20 to 80 |
| Voltage source 24 | volts D.C. | 35 |
| Voltage source 25 | do | 35 |
| Voltage source 15 | do | 50 |
| Voltage source 54 | do | 150 |
| Gap voltage | D.C. | 0 to 60 |

While I have shown and described one illustrative embodiment of the method and apparatus of this invention, it is understood that the concepts thereof may be applied to other embodiments without departing from the spirit and scope of this invention. For example, other forms of timing means may be substituted for the first and second timing means. Similarly, other forms of switching means may be employed for the combination of vacuum tube and relay arrangement.

What I claim is:

1. In an electrical control system for a machining apparatus having a tool for engaging a workpiece in a machining relationship, having a single actuating means for advancing said tool relative to the workpiece and for retracting said tool relative to said workpiece, the combination comprising:

actuating means for controlling the direction and rate of movement of said tool;

a source of unidirectional pulses coupled to said actuating means, said tool and said workpiece;

a first source of electrical energy for controlling the retraction of the tool relative to the workpiece;

first switching means for connecting said first source to said actuating means;

a second source of electrical energy for controlling the advance of said tool relative to said workpiece;

second switching means for connecting said second source of said actuating means;

first timing means coupled to said first switching means for controlling the period of actuation of said first switching means; and, speed control means coupled to said actuating means for controlling the rate of movement of said electrode relative to said workpiece.

2. The combination according to claim 1, wherein said second switching means is coupled to said first switching means for selectively controlling the connection of said first switching means to said actuating means.

3. The combination according to claim 2 further including second timing means coupled to said second switching means for controlling the period of operation of said second switching means.

4. The combination according to claim 3 further comprising manual switch means for selectively connecting said first source to said actuating means.

5. The combination according to claim 3 further comprising manual switch means for selectively connecting said second source to said actuating means.

6. The combination according to claim 5, further comprising a reference source of electrical energy;

a speed control means coupled to said reference source and to said actuating means for controlling the rate of movement of said tool relative to said workpiece; and, means for rapidly retracting said tool if said tool contacts said workpiece.

7. A singular power feed control system for an electrical discharge machining apparatus, having an electrode tool for engaging a workpiece in a machining operation, comprising:

(a) a normal servo control means (15-16-17-18-20);

(b) electronic circuit means for interrupting and overriding normal servo control means to effect the automatic cyclic retraction of the electrode tool from said workpiece and subsequent repositioning of the electrode tool in close proximity to the workpiece at operator preselected frequency or repetition rate, amplitude of motion, and speed of motion (24-25-54 - 52 - 80 - 73 - 79 - 72 - 82 - 75 - 76 - 85 - 44-49-96-68-100-93);

(c) jog means to provide for manual override of said normal servo control means and said electronic circuit interrupter means (24-25-28-33-30-35);

(d) short circuit control means to provide for automatic override of said normal servo control means, electronic circuit interrupter means, and jog means (22-21); and wherein normal servo control is automatically reestablished after said electrode tool has been repositioned in close proximity to said workpiece.

8. A singular power feed control system for an electrical discharge machining apparatus, as defined in claim 7, wherein said normal servo control means comprises:

(a) means for advancing said tool relative to said workpiece and for retracting said tool relative to said workpiece (15-18-19);

(b) actuating means for controlling the direction and rate of movement of said electrode tool (16-17-20); and (c) a source of unidirectional pulses coupled to said actuating means, said electrode tool, and said workpiece (10).

9. A singular power feed control system for an electrical discharge machining apparatus, as defined in claim 8, further comprising:

(a) a first switching means for connecting said source of electrical energy to said actuating means;

(b) a second switching means for connecting said source of electrical energy to said actuating means; and whereby retraction and/or advance of said electrode tool is effected thereby.

10. A singular power feed control system for an electrical discharge machining apparatus, as defined in claim 9, wherein said electronic circuit interrupter means is coupled to said first and second switching means for controlling the movement of said electrode tool relative to said workpiece (lower half of FIG. 4).

11. A singular power feed control system for an electrical discharge machining apparatus as defined in claim 9, further comprising:

(a) a first timing means coupled to said first switching means for controlling the period of actuation of said first switching means (52-72-73);

(b) a second timing means coupled to said second switching means for controlling the period of actuation of said second switching means (52-79-80-82); and whereby fast retraction of said electrode tool is effected for a predetermined period of time and advance of said electrode tool is effected for a predetermined period of time less than said fast retraction of said electrode tool.

12. A singular power feed control system for an electrical discharge machining apparatus, as defined in claim 9, further comprising:

(a) manual switch means for selectively connecting said source of electrical energy to said actuating means, whereby retraction and/or advance of said electrode tool is effected thereby (30-35).

13. A singular power feed control system for an electrical discharge machining apparatus, as defined in claim 7, further comprising:

(a) a control means coupled to said source of electrical energy and said actuating means (16-17) for controlling the amplitude (80-73) and rate (24-25) of said electrode tool relative to said workpiece (24-25-73-80);

(b) means for rapidly retracting said electrode tool from said workpiece if said electrode tool contacts said workpiece (11-3-5-16-21-18).

References Cited

UNITED STATES PATENTS

| | | | |
|---|---|---|---|
| 2,967,226 | 1/1961 | De Bruijn | 219—69 |
| 3,128,364 | 4/1964 | Wanttaja et al. | 219—69 |

FOREIGN PATENTS 759,190 10/1956 Great Britain.

RICHARD M. WOOD, *Primary Examiner.*

R. F. STAUBY, *Assistant Examiner.*